US012683797B2

(12) United States Patent
Sirdey et al.

(10) Patent No.: US 12,683,797 B2
(45) Date of Patent: Jul. 14, 2026

(54) CONDITIONAL AUTHENTICATION ACCESS CONTROL METHOD

(71) Applicant: COMMISSARIAT A L'ENERGIE ATOMIQUE ET AUX ENERGIES ALTERNATIVES, Paris (FR)

(72) Inventors: Renaud Sirdey, Gif-sur-Yvette (FR); Aymen Boudguiga, Gif-sur-Yvette (FR); Martin Zuber, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 177 days.

(21) Appl. No.: 18/460,075

(22) Filed: Sep. 1, 2023

(65) Prior Publication Data

US 2024/0080202 A1      Mar. 7, 2024

(30) Foreign Application Priority Data

Sep. 5, 2022    (FR) ..................................... 22 08881

(51) Int. Cl.
  H04L 29/06         (2006.01)
  H04L 9/32          (2006.01)
(52) U.S. Cl.
  CPC ................................. H04L 9/3234 (2013.01)
(58) Field of Classification Search
  CPC ............................................... H04L 9/3234
  USPC ....................................................... 713/172
  See application file for complete search history.

(56) References Cited

U.S. PATENT DOCUMENTS

| | | | | |
|---|---|---|---|---|
| 2011/0246768 | A1* | 10/2011 | Mahmud ............... | H04L 9/0662 |
| | | | | 713/167 |
| 2014/0281568 | A1* | 9/2014 | Ross ....................... | G06F 21/32 |
| | | | | 713/186 |
| 2017/0277775 | A1* | 9/2017 | Eigner ..................... | H04L 9/08 |
| 2018/0234404 | A1* | 8/2018 | Campagna .............. | H04L 63/06 |
| 2019/0052456 | A1* | 2/2019 | Bygrave ............. | G06F 21/6209 |

(Continued)

OTHER PUBLICATIONS

Zou, "A Survey on Wireless Security:Technical Challenges, Recent Advances, and Trends", 2016, IEEE, pp. 1727-1760 (Year: 2016 ).*

(Continued)

*Primary Examiner* — Taghi T Arani
*Assistant Examiner* — Gregory A Lane
(74) *Attorney, Agent, or Firm* — Oblon, McClelland, Maier & Neustadt, L.L.P.

(57) ABSTRACT

A method for controlling access of a user equipped with a terminal to a physical or logical resource, the method involving a secure cryptographic device forming a token corresponding to an access criterion, the access token being intended to generate a keystream masking a biometric reference of the user obtained by a biometric reader of the terminal. The biometric reference thus masked is encrypted by fully homomorphic encryption and stored in a database hosted by a remote server. An access control operator obtains a biometric characteristic of the user, homomorphically encrypts it and transmits it to the remote server. This server compares the first and second biometric models in the homomorphic domain and supplies the homomorphically-encrypted result of the comparison to the access control operator. The latter grants or denies access to the user according to the result of the comparison, after having decrypted it.

10 Claims, 4 Drawing Sheets

(56)     References Cited

U.S. PATENT DOCUMENTS

| | | | | |
|---|---|---|---|---|
| 2019/0130125 | A1* | 5/2019 | Yoshino | H04L 9/06 |
| 2019/0305966 | A1* | 10/2019 | Qiu | H04L 9/3239 |
| 2020/0007329 | A1* | 1/2020 | Guilford | H04L 9/32 |
| 2020/0021569 | A1* | 1/2020 | Simons | H04L 63/12 |
| 2020/0235914 | A1* | 7/2020 | Zhang | H04L 9/0869 |
| 2020/0412715 | A1* | 12/2020 | Chen | H04W 12/06 |
| 2021/0099308 | A1* | 4/2021 | Abbas | H04L 9/3242 |
| 2021/0126903 | A1* | 4/2021 | Racz | H04L 63/061 |
| 2021/0367786 | A1 | 11/2021 | Sheets et al. | |
| 2022/0353083 | A1* | 11/2022 | Agrawal | H04L 9/3231 |

OTHER PUBLICATIONS

Zou, "A Survey on wireless security: Technical challenges, recent advances, and future trends", 2016, IEEE, pp. 1727-1760 (Year: 2016).*

French Preliminary Search Report issued Apr. 19, 2023 in French Application 22 08881 filed on Sep. 5, 2022, 2 pages (with English Translation of Categories of Cited Documents).

Bendoukha et al., "Revisiting Stream-Cipher-Based Homomorphic Transciphering in the TFHE Era", 2022, p. 19-33.

Carpov et al., "Practical Privacy-Preserving Medical Diagnosis using Homomorphic Encryption" 2016 IEEE 9th International Conference on Cloud Computing, 2016, p. 593-599.

Singh et al., "Practical Personalized Genomics in the Encrypted Domain" 2018 Third International Conference on Fog and Mobile Edge Computing (FMEC), 2018, p. 139-146.

Liu et al., "How to build time-lock encryption" Des. Codes Cryptogr., vol. 86, 2018, p. 2549-2586.

* cited by examiner

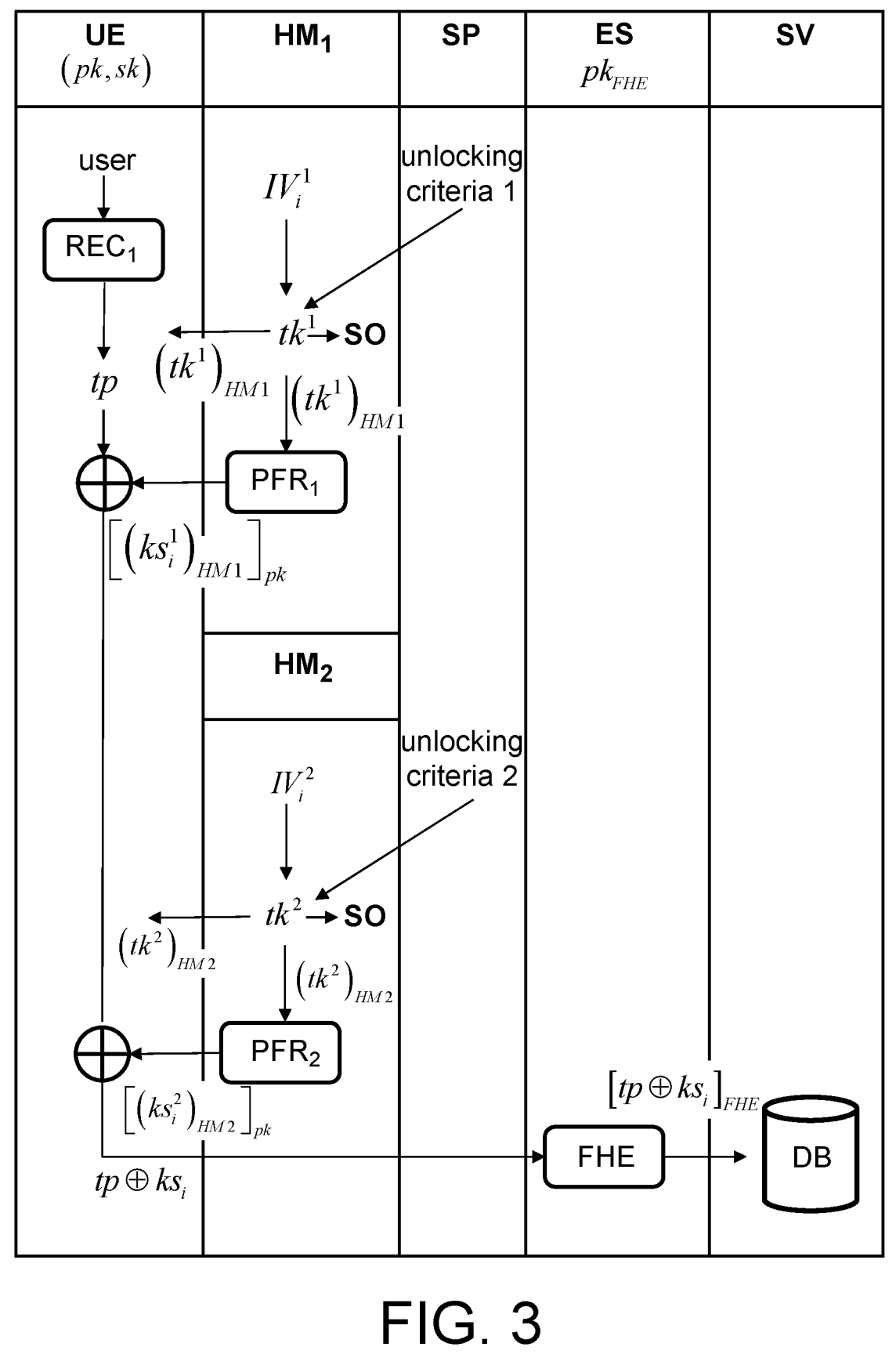

| UE $(pk, sk)$ | $HM_1$ | SP | ES $pk_{FHE}$ | SV |
|---|---|---|---|---| user $IV_i^1$ unlocking criteria 1

$REC_1$ $tk^1 \rightarrow$ SO

$tp$ $\left(tk^1\right)_{HM1}$   $\left(tk^1\right)_{HM1}$ $\oplus \leftarrow$ $PFR_1$ $\left[\left(ks_i^1\right)_{HM1}\right]_{pk}$

$HM_2$

$IV_i^2$ unlocking criteria 2

$tk^2 \rightarrow$ SO

$\left(tk^2\right)_{HM2}$   $\left(tk^2\right)_{HM2}$ $\oplus \leftarrow$ $PFR_2$ $\left[\left(ks_i^2\right)_{HM2}\right]_{pk}$ $\left[tp \oplus ks_i\right]_{FHE}$ FHE $\rightarrow$ DB $tp \oplus ks_i$

FIG. 3

CONDITIONAL AUTHENTICATION ACCESS CONTROL METHOD

TECHNICAL FIELD

The present invention generally relates to the field of access control, whether a physical access or a logical access.

PRIOR ART

Access control covers the different techniques allowing securing and managing access to a location, a service or generally to a logical or physical resource. Many access control techniques are known from the state of the art. For example, in the case of access to a location, the access control may be carried out by an electronic latch, a badge reader, a biometric reader such as a fingerprint reader, a face or voice recognition system. In the case of access to an information system or to a logical resource such as an online service, the access control may be carried out by reading of a PIN code, a password, the generation and input of a single-use code, the answer to a riddle, etc. Next, we will consider the access control methods involving an authentication of the user, in particular a biometric authentication.

In some particular cases, access is granted to the user only to the extent that a given condition is met. For example, this condition may be the elapse of a time period, the correspondence of a time with a time frame, the position at a given place or in a given geographic area.

For example, it is known to encrypt a message and to enable decryption thereof by a third party only when some time has elapsed. A description of this time-based conditional access method could be found in the article by J. Liu et al. Entitled "How to build time-lock encryption" Des. Codes Cryptogr., vol 86, pp. 2549-2586, (2018). Nonetheless, this technique is based on a blockchain using a proof-of-work (PoW) type consensus mechanism does not enable a time resolution less than the interval, separating two consecutive blocks. Furthermore, it cannot be generalised to other access condition types, for example to an access time point which should belong to a predetermined time frame or else to a position of the user which should belong to a predetermined geographic area.

The present invention aims to provide a conditional access control method, involving an authentication of the user and which could simply adapt to different condition types and does not require resorting to a blockchain.

DISCLOSURE OF THE INVENTION

The present invention is defined by a method for controlling access of a user to a physical or logical resource, said user being equipped with a terminal (UE) provided with a first authentication device ($REC_1$), said access control method comprising a phase of signing-in before a service provider (SP) and a phase of verification before an access control operator, said method being characterised in that, in the first phase:

a secure cryptographic module (HSM) generates an access token from an access criterion defined by the service provider then generates a keystream ($ks_i$) by means of a stream encryption, from the access token and from an initialisation vector ($IV_i$), said keystream being transmitted to the terminal;

the terminal obtains an authentication reference (tp) of the user by means of the first authentication device, masks this authentication reference by means of the keystream and transmits it to a homomorphic encryption unit to obtain a masked and encrypted authentication reference ($[tp \oplus ks_i]_{FHE}$) by means of a public key of a homomorphic cryptosystem, the masked and encrypted authentication reference being transmitted to a remote server (SV) to be stored in a database (DB);

and that, in the second phase:

the access control operator transmits the access token to the secure cryptographic device, the latter generating the keystream again if the access criterion is met and then transmitting it to the remote server;

the access control operator obtains an authentication characteristic (c) of the user by means of a second authentication device ($REC_2$), encrypts this authentication characteristic by means of the public key of said homomorphic cryptosystem and transmits to the remote server the authentication characteristic thus encrypted ($[c]_{FHE}$);

the remote server sums up the encrypted authentication reference of the user with the keystream so as to obtain the homomorphically-encrypted authentication reference of the user;

the remote server performs a comparison of the authentication characteristic and of the authentication reference in the homomorphic domain and transmits to the access control operator the result of the comparison obtained in the homomorphic domain ($[r]_{FHE}$);

the access control operator decrypts the result of the comparison by means of the private key of the homomorphic cryptosystem and grants or denies access to the user according to the result thus decrypted (r).

In particular, the access token may be obtained by aggregating a plurality of access conditions defined by the service provider.

The plurality of access conditions typically comprises at least one time-based access condition and one space-based access condition.

Advantageously, the access token is signed by the secure cryptographic device before being transmitted to the terminal, the latter verifying its origin by means of the signature.

The initialisation vector may be incremented at each new phase of signing in the user.

Advantageously, the keystream generated by the secure cryptographic device is signed by the secure cryptographic device then encrypted by means of the public key of a cryptosystem of the user, the terminal decrypting the keystream by means of the private key of this cryptosystem and verifying the origin of the keystream by means of the signature.

According to one embodiment, the terminal masks the first biometric model with the keystream by means of a XOR operation.

The first and second authentication devices may be biometric readers of the same type, the authentication reference being a biometric reference and the authentication characteristic being a biometric characteristic.

The comparison between the biometric characteristic and the biometric reference may then be based on the classification of this characteristic and of this reference in a plurality of classes, the comparison being conclusive if the classes in which they are classified are identical.

The present invention also relates to a method for controlling access of a user to a physical or logical resource, said user being equipped with a terminal (UE) provided with a first authentication device ($REC_1$), said access control method comprising a phase of signing-in before a service provider (SP) and a phase of verification before an access control operator, said method being remarkable in that, in the first phase:

a plurality of cryptographic modules ($HM_1$, $HM_2$), each cryptographic module generating an access token from an elementary access criterion defined by the service provider then generating a corresponding keystream $$\left(ks_i^1, ks_i^2\right)$$

by means of a stream encryption, from the access token associated with the elementary access criterion and an initialisation vector $$\left(IV_i^1, IV_i^2\right),$$

said keystream being transmitted to the terminal;

the terminal obtains an authentication reference (tp) of the user by means of the first authentication device, masks this authentication reference by means of the key-streams, transmits the authentication reference thus masked to a homomorphic encryption unit, to obtain a masked and encrypted authentication reference ($[tp \oplus ks_i]_{FHE}$) by means of a public key of a homomorphic cryptosystem, the masked and encrypted authentication reference being transmitted to a remote server (SV) to be stored in a database (DB);

and that, in the second phase:

the access control operator transmits the access tokens to the cryptographic modules that have generated them, each operator generating the keystream again if the associated elementary access criterion is met and then transmitting it to the remote server;

the access control operator obtains an authentication characteristic (c) of the user by means of a second authentication device ($REC_2$), encrypts the authentication characteristic by means of the public key of said homomorphic cryptosystem and transmits to the remote server the authentication characteristic thus encrypted ($[c]_{FHE}$);

the remote server successively sums up the masked and encrypted authentication reference of the user with the keystreams of said plurality so as to obtain the homomorphically encrypted authentication reference of the user;

the remote server performs a comparison of the authentication characteristic and of the authentication reference in the homomorphic domain and transmits to the access control operator the result of the comparison obtained in the homomorphic domain ($[r]_{FHE}$);

the access control operator decrypts the result of the comparison by means of the private key of the homomorphic cryptosystem and grants or denies access to the user according to the result thus decrypted (r).

BRIEF DESCRIPTION OF THE FIGURES

Other features and advantages of the invention will appear upon reading a preferred embodiment of the invention, made with reference to the appended figures wherein:

FIG. 3 schematically shows a sign-in phase of a conditional authentication access control method, according to a second embodiment of the invention;

DESCRIPTION OF THE EMBODIMENTS

Figure 1:
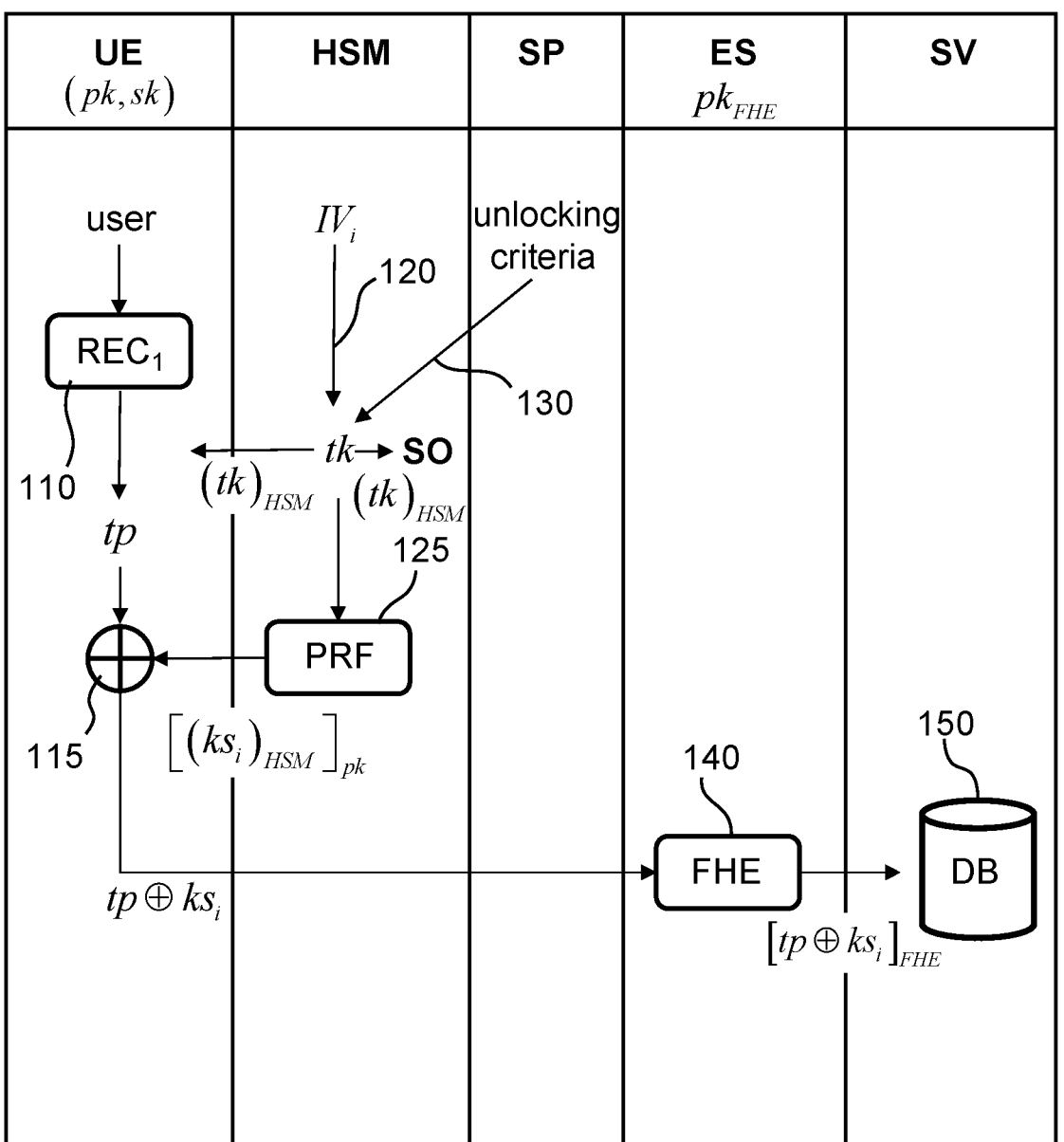
FIG. 1 schematically shows a sign-in phase of a conditional authentication access control method, according to a first embodiment of the invention.

Next, we will consider the context of implementation of the physical or logical access control method, conditioned by the achievement of an access criterion. As mentioned before, the access criterion (or access condition) could be of the time-based type, for example the elapse of a determined time period or the correspondence of the time point when the access request is transmitted by the user to the access control operator with a time frame. Alternatively, the access criterion could of the space-based type, for example the location of the user in a given geographic area (a country for example), and possibly a given place (entrance of a protected space). Finally, the access criterion could be the combination of a time-based criterion and of a space-based criterion.

The access control method involves a plurality of entities:

a user equipped with a terminal (mobile or not) referred to as UE (User Equipment). The terminal is equipped with a device for acquiring an authentication reference, for example a biometric reader intended to obtain a biometric reference (template) of the user;

a service provider referred to as SP (Service Provider) defining the criterion for access to a logical or physical resource for the considered user;

an access control operator or SO (Service Operator) verifying whether the access request of the user meets, or not, the access criterion and accordingly granting, or denying, access of the user to the considered resource. In this respect, it serves as a delegatee of the service provider. Advantageously, the access control operator is equipped with a device for acquiring an authentication characteristic, for example a biometric reader, of the same type as that one embedded in the terminal UE;

a secure cryptographic device referred to as HSM (Hardware Security Module) or BNT (transactional black box, from the French "Boite Noire Transactionnelle") capable of generating, storing and protecting cryptographic keys. In one variant, the secure cryptographic device may belong to the service provider SP;

a homomorphic encryption unit, ES, adapted to perform an encryption by means of the public key of a homomorphic cryptosystem as described later on. This homomorphic encryption unit may be independent or belong to the service provider;

a remote server, SV, hosting a database, DB (Data-Base), in which authentication references are confidentially stored, for example biometric references, of different users.

To illustrate the context by a practical case, the service provider may be an airway or railway company, the organiser of a show; and the access control operator is a device which verifies whether the user could get on board the train/aircraft or enter the show venue. The terminal UE may be a smartphone and the embedded biometric reader a camera coupled to a software capable of extracting a face model representing characteristic of the face of the user.

Similarly, the access control operator is equipped with a camera and with a face recognition software capable of comparing the characteristics of an image captured by this camera and of comparing them with a face model present in the database DB.

In any case, controlling access of the user involves an authentication of the latter. The idea at the origin of the present invention is to enable this authentication only when the condition is met, this activation of the authentication being carried out by means of a decryption operation in the homomorphous domain.

More specifically, the access control method comprises two distinct phases: a first phase (enrolment phase) during which the user signs in before the service provider SP and a second phase (access phase) during which the user requires an access, the operator then verifying, in a confidential manner, whether the access criterion is actually met to grant him or deny him access to the resource.

FIG. 1 schematically shows a sign-in phase (enrolment) of a conditional authentication access control method, according to a first embodiment of the invention.

The user is provided with an asymmetric cryptosystem made up by a pair (pk,sk) where sk is the private key and pk the corresponding public key.

In step 110, the terminal UE generates, for example by means of the embedded biometric reader, an authentication reference tp, for example a biometric reference in the form of a face model, a voice model, a fingerprint model (minutiae), allowing unequivocally authenticating the user.

Moreover, the secure cryptographic module HSM receives, in 130, from the service provider an access criterion (unlocking criteria), this criterion may be composed of one or more access condition(s). For example, an access condition may be time-based (date, hour, time frame), space-based (GPS coordinates of a location or of points defining the perimeter of an area) or other (knowledge of a PIN code or of a password). When the criterion is defined by several access conditions of different natures, the criterion is so-called composite.

The secure cryptographic module builds, in 120, an access token tk aggregating the access conditions, so that it is possible, starting from this token, to regenerate the access condition and to verify whether they are actually met. This token materialises the commitment of the service provider SP or of the module HSM to meet the access criterion, with regards to the user.

The module, HSM, which is itself provided with its asymmetric cryptosystem, signs the token tk with its private key and transmits the access token thus signed, $(tk)_{HSM}$, on the one hand, to the access control operator, SO, and on the other hand, to the terminal of the user, UE.

Moreover, the module HSM generates, in 125, a keystream $ks_i$, allowing performing a stream encryption (stream cipher). It should be reminded that a stream encryption is an encryption in which the message to be encrypted is simply added to a bit sequence generated from a symmetric key and from an initialisation vector, $IV_i$. The symmetric key may be considered to be equal to the access token.

The keystream could be generated by means of a pseudo-random function or PRF (Pseudo Random Function), for example by means of an encryption primitive known to a person skilled in the art such as AES-CTR (Advanced Encryption Standard in Counter Mode), Grain, Trivium, etc.

Regardless of the retained stream encryption algorithm, the keystream, $ks_i$ is signed afterwards by the private key of the module HSM and then encrypted by means of the public key of UE, pk. The keystream thus signed and encrypted, $[(ks_i)_{HSM}]_{pk}$, is supplied to the terminal of the user, UE.

After having decrypted $[(ks_i)_{HSM}]_{pk}$ and verified, thanks to the signature, that the keystream and the access token actually originate from the module HSM, the terminal UE performs a stream encryption of the authentication reference, tp, of the user. The encryption is carried out in 115 by means of a simple XOR operation on a bit basis, namely $tp \oplus ks_i$. The stream $ks_i$ may be considered as a disposable mask or OTP (One-Time Pad) because it is used only once to mask the authentication reference. The authentication reference thus encrypted (or masked) by the user is transmitted in 117 to the homomorphic encryption unit, ES.

The unit ES performs, in 140, a fully homomorphic encryption or FHE (Full Homomorphic Encryption) of the authentication reference thus masked. It should be reminded that a homomorphic encryption FHE allows performing operations (in practice arithmetic operations of addition or multiplication) on data without ever revealing them. More specifically, a fully homomorphic encryption FHE is an asymmetric key encryption $Enc_{FHE}$ (with the public key $pk_{FHE}$) meeting the following properties:

$$Enc_{FHE}: \Omega \rightarrow \Gamma$$

$$Dec_{FHE}[Enc_{FHE}(a) \oplus Enc_{FHE}(b)] = a+b \qquad (1\text{-}1)$$

$$Dec_{FHE}[Enc_{FHE}(a) \otimes Enc_{FHE}(b)] = a \times b \qquad (1\text{-}2)$$

where $\Omega$ is the plaintext message space (more simply referred to as plaintext space) and $\Gamma$ is the encrypted message space (more simply referred to as ciphertext space), $+$, $\times$ respectively an additive operation and a multiplicative operation in the plaintext space conferring a ring structure on $\Omega$, $\oplus$, $\otimes$ respectively an internal addition operation and an internal multiplication operation in the ciphertext space conferring a ring structure on $\Gamma$. Thus, it should be understood that the application of $(\Omega, +)$ in $(\Gamma, \oplus)$ is a ring homomorphism. $Dec_{FHE}$ is the decryption function corresponding to $Enc_{FHE}$ (where $sk_{FHE}$ is the secret key of the user). Next, for consistency-related reasons, we will note more simply the homomorphic encryption of a: $[a]_{FHE} = Enc_{FHE}(a)$.

It is also possible to define an external addition operation of $\Omega \times \Gamma$ in $\Gamma$, denoted $\oplus_{ext}$, by means of:

$$a \oplus_{ext} [b]_{FHE} = [a]_{FHE} \oplus [b]_{FHE} \qquad (2)$$

in which case:

$$Dec_{FHE}[a \oplus_{ext} [b]_{FHE}] = a+b \qquad (3)$$

The homomorphic encryption of the masked authentication reference, namely $[tp \oplus ks_i]_{FHE}$, is transmitted to the remote server SV which stores it in 150 in the database DB, where appropriate in connection with a code supplied by the user. This code may be obtained by hashing of an identifier of the user with the content of a counter, said counter being incremented each time the user signs in before the service provider.

Consequently, the database DB stores authentication references in a confidential manner, such as biometric references of a user population, encrypted twice: the first encryption layer is that of the stream encryption or masking with a key derived from the access criterion and the second encryption layer is that of the fully homomorphic encryption. Thus, it should be understood that, although the server would have been provided with the private key $sk_{FHE}$, it would not be able to access the authentication references of the users.

Figure 2:
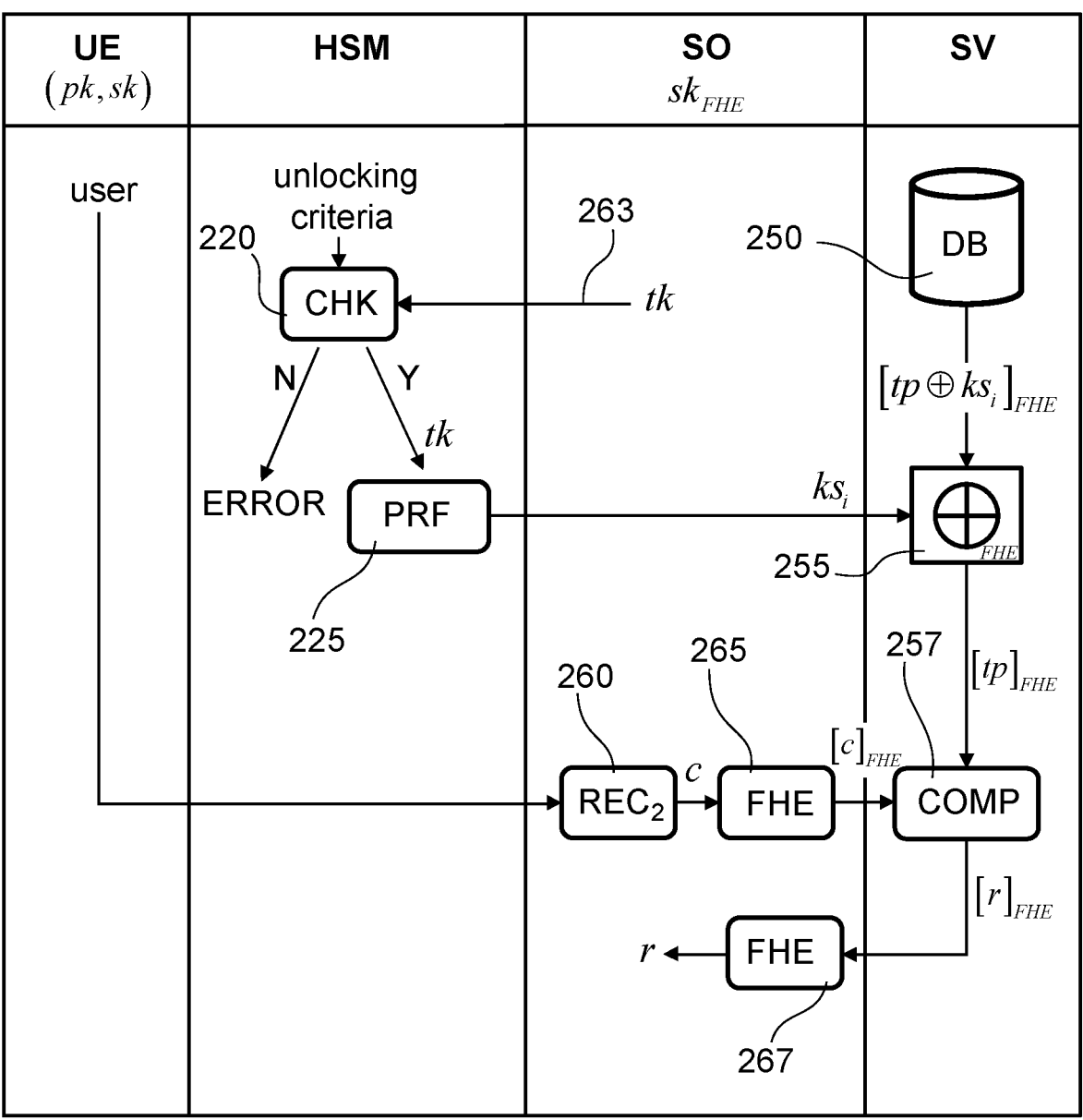
FIG. 2 schematically shows a verification phase of a conditional authentication access control method, according to a first embodiment of the invention.

FIG. 2 schematically shows a verification phase of a conditional authentication access control method, according to a first embodiment of the invention.

In this phase, the user appears before the access control operator SO.

The latter obtains, in 260, an authentication characteristic of the user. For example, it acquires, thanks to its biometric reader $REC_2$, a biometric characteristic of the user. This authentication characteristic (or challenge) c is encrypted by the operator SO by means of the fully homomorphic encryption public key $pk_{FHE}$, in 265, then transmitted, in the form $[c]_{FHE}$, to the remote server, SV.

According to a first variant, the user transmits his signed access token, $(tk)_{HSM}$, to the access control operator, where appropriate after having signed it himself. In this case, the operator verifies the origin of the token and transmits it, in 263, to the module HSM.

According to a second variant, the access control operator supplies an identifier and the access control operator searches for the corresponding signed access token.

According to a third variant, the access control operator is provided with an implicitly signed access token, for example because it corresponds to a time frame or to the location where it is located.

Of course, different combinations of these variants can be considered by a person skilled in the art without departing from the scope of the present invention.

In any case, the operator SO transmits the signed access token to the module HSM, and the latter verifies in 220 whether the corresponding access criterion is met. If not, the module HSM sends back an error message and access is denied. However, if the access criterion is met, the module HSM generates again in 225 the disposable mask $s_i$, using the pseudo-random function PRF, from the access token tk, and transmits it to the server SV.

Starting from the code or the identifier of the user, the server SV finds out in 250 in the database the homomorphic encryption of the masked authentication reference, $[tp \oplus ks_i]_{FHE}$. In 255, the server performs an external addition operation between the homomorphic encryption of the masked authentication reference and the keystream received from the module HSM, in other words computes $ks_i \oplus_{ext}$ $[tP \oplus ks_i]_{FHE} = [tp]_{FHE}$, which allows pulling off the mask in the homomorphic domain.

At this level, the server SV is consequently provided, on the one hand, with the homomorphically-encrypted authentication reference, $[tp]_{FHE}$, supplied by the user when signing in and, on the other hand, with the authentication characteristic also homomorphically encrypted $[c]_{FHE}$, supplied by the operator during the access control.

The server may then compare, in 257, the authentication characteristic with the authentication reference, i.e. Determine in the homomorphic domain whether the authentication characteristic c and the authentication reference tp are equivalent, i.e. Actually correspond to the same user. In some simple cases, the equivalence relationship may be a mere identity. However, in most cases, the authentication characteristic will differ from the reference. For example, the biometric characteristic of a user may differ from his biometric reference. Nonetheless, they will be considered to be equivalent if they belong to the same intersection of equivalence classes, in other words if there is identity of the equivalence classes in which the biometric characteristic and reference are classified. Thus, the classification operation may be carried out in the homomorphic domain, as described for example in the patent FR-B-3095537 in the name of the present Applicant.

The result of the comparison is supplied to the access control operator, SO, in an encrypted form in the homomorphic domain, $[r]_{FHE}$, where r may for example take on the binary value "1" or "0" depending on whether an equivalence is detected or not. It should be noted that it is impossible to distinguish an encrypted value $[0]_{FHE}$ from an encrypted value $[1]_{FHE}$ since there is a large number of such values for either one.

The access control operator, SO, decrypts in 267 the result of the comparison by means of the private key $sk_{FHE}$ and deduces whether access to the resource should be granted or not to the user.

A person skilled in the art should understand that the mask generated by the module HSM makes any collusion ineffective between the access control operator SO and the server SV of the database. Indeed, as long as the mask is present, the access control operator and the server cannot act together to access the authentication reference (ex. The biometric reference) of the user (which would enable a theft of his identity). However, once the mask is eliminated, a collusion between the access control operator and the server allows recovering the authentication reference. Thus, when the access criterion is composite, the vulnerability of sensitive data is limited to a reduced space-time frame. The conventional (yet barely realistic in practice) assumption of a "semi-honest" behaviour of the entities involved in the access control method, according to which the entities would comply with the protocol but would be curious to access to the protected data is no longer required. More specifically, all it needs henceforth is that this assumption is met during the access frame.

The first embodiment of the access control method involves only one single mask generated by a module HSM, including when the access criterion is composite. However, according to a second embodiment, a plurality of cryptographic modules that are not necessarily secure, called HM, are used, each module HM generating a partial mask from an elementary access criterion. More specifically, the access criterion is met only if each elementary criterion is met. For example, in the case of a space-time based access criterion, a first partial criterion may be associated with a time-based condition and a second partial criterion may be associated with a geographic condition. According to one variant, the partial criteria may be redundant, and even identical. In this case, the matter does not consist in decomposing a composite access criterion into elementary criteria but rather in improving the security of the access control by generating independent access tokens.

FIG. 3 schematically shows a sign-in phase of a masked authentication access control method according to a second embodiment of the invention.

Unlike the first embodiment, the access control method herein involves N>1 independent modules HM. The particular case shown in FIG. 3 corresponds to N=2 but a person skilled in the art should understand that the method is generalised without difficulty to any plurality N.

The first cryptographic module, HM1, builds in 321 a first access token $tk^1$ corresponding to a first elementary access criterion transmitted by the service provider SP, signs the token $tk^1$ with its private key and transmits the access token thus signed, $(tk^1)_{HM1}$, on the one hand, to the access control operator, SO, and on the other hand, to the terminal of the user, UE. Similarly, the second cryptographic module, HM2, builds in 322 a second access token $tk^2$ corresponding to a second elementary access criterion transmitted by the service provider SP, signs the token $tk^2$ with its private key and transmits the access token thus signed, $(tk^2)_{HM2}$, on the one hand, to the access control operator, SO, and on the other hand, to the terminal of the user, UE.

The module HM1 (resp. HM2) generates a first keystream $$ks_i^1$$

(resp. a second keystream $$ks_i^2)$$

from a first (a second) initialisation vector, $$IV_i^1$$

(resp.

$$IV_i^2)$$

and a first (second) symmetric key equal to the first (second) access token. The first (second) keystream could be generated by means of a first (second) pseudo-random function PRF1 (PRF2).

The module HM1 signs the first keystream, $$ks_i^1,$$

then encrypts it by means of the public key of UE, pk. Similarly, the module HM2 signs the second keystream, $$ks_i^2,$$

then encrypts it by means of the public key of UE, pk.

The keystreams thus signed and encrypted, $$[(ks_i^1)_{HM1}]_{pk}, [(ks_i^2)_{HM2}]_{pk},$$

are supplied to the terminal of the user, UE, which decrypts them using its private key sk and verifies their origin using the signatures.

The first (second) keystream serves as a first (second) partial mask. The first and second partial masks are added to the authentication reference of the user, namely $$tp \oplus ks_i^1 \oplus ks_i^2 = tp \oplus ks_i,$$

to supply an authentication reference masked with $$ks_i = ks_i^1 \oplus ks_i^2.$$

Like in the first embodiment, the authentication reference thus masked is transmitted afterwards to the homomorphic encryption entity, which encrypts it by means of its homomorphic public key before transmitting it to the server SV.

It should be pointed out in this second embodiment that the robustness of the stream encryption is not ensured herein by a unique secure cryptographic module but by the fact that the keystream $ks_i$ distributed over a plurality of independent modules and that it is difficult to simultaneously attack all these modules.

Figure 4:
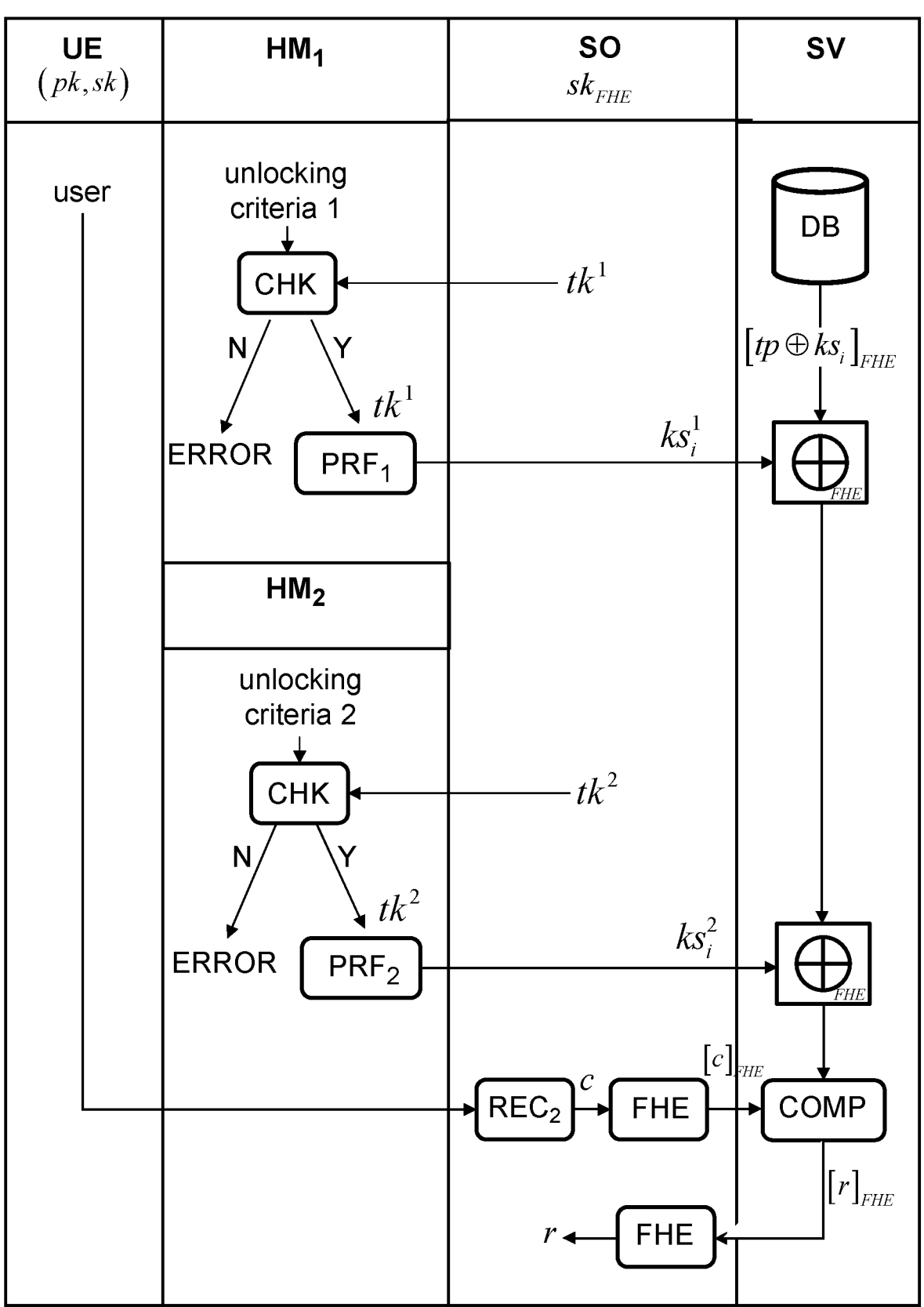
FIG. 4 schematically shows a verification phase of a conditional authentication access control method, according to a second embodiment of the invention.

FIG. 4 schematically shows a verification phase of a conditional authentication access control method according to a second embodiment of the invention.

In this second phase, like in the first embodiment, the access control operator obtains thanks to its authentication device (herein the biometric reader $REC_2$) an authentication characteristic of the user then homomorphically encrypts it before transmitting it to the remote server. Where appropriate, the user also provides the operator with his signed access tokens $(tk^1)_{HM1}$ and $(tk^2)_{HM2}$ after having signed them himself with his private key. The variants considered for the first embodiment apply herein too.

After having verified the origin of the access tokens, the access service operator transmits the first access token $tk^1$ to the module HM1 and the second access token $tk^2$ to the module HM2.

The module HM1 verifies whether the first elementary access criterion is met. If not, the latter sends back an error message and access is denied. Conversely, if the first elementary access criterion is met, the module HM1 generates again the first partial mask $$ks_i^1$$

and transmits it to the server SV.

The module HM2 proceeds similarly with the second elementary access criterion. If the latter is met, it generates again the second partial mask $$ks_i^2$$

and transmits it to the server SV.

Starting from the code of the user or his identifier, the server SV finds out in the database the homomorphic encryption of the masked authentication reference, $[tp \oplus ks_i]_{FHE}$. It performs an external addition operation between the homomorphic encryption of the authentication reference with the first keystream received from the module HM1, then with the second keystream received from the module HM2, which allows pulling off the mask in the homomorphic domain.

Like in the first embodiment, the server SV performs a comparison between the authentication characteristic c and the authentication reference tp of the user in the homomorphic domain. The result of the comparison, homomorphically encrypted, is transmitted to the access operator which decrypts it using the key $sk_{FHE}$. It grants or denies access of the user to the resource according to the comparison result thus decrypted.

The invention claimed is:

1. A method for controlling access of a user to a physical or logical resource, said user being equipped with a terminal provided with a first authentication device, said access control method comprising a signing-in phase with a service provider and a verifying phase with an access control operator, wherein the signing-in phase comprises:

generating, by a secure cryptographic device, an access token from an access criterion defined by the service provider, generating a keystream using a stream encryption, from the access token and from an initialization vector, and transmitting the keystream to the terminal; and obtaining, by the terminal, an authentication reference of the user using the first authentication device, masking the authentication reference using the keystream, and transmitting the masked authentication reference to a homomorphic encryption unit to obtain a masked and encrypted authentication reference using a public key of a homomorphic cryptosystem, the masked and encrypted authentication reference being transmitted to a remote server to be stored in a database, and the verifying phase comprises:

transmitting, by the access control operator, the access token to the secure cryptographic device, the secure cryptographic device generating the keystream again if the access criterion is met, and transmitting the keystream to the remote server;

obtaining, by the access control operator, an authentication characteristic of the user using a second authentication device, encrypting the authentication characteristic using the public key of said homomorphic cryptosystem, and transmitting, to the remote server, the encrypted authentication characteristic;

performing, by the remote server, an addition operation of adding the encrypted authentication reference of the user to the keystream so as to obtain the homomorphically-encrypted authentication reference of the user;

performing, by the remote server, a comparison of the encrypted authentication characteristic and the homomorphically-encrypted authentication reference in a homomorphic domain, and transmitting, to the access control operator, a result of the comparison obtained in the homomorphic domain; and decrypting, by the access control operator, the result of the comparison using a private key of the homomorphic cryptosystem, and granting or denying access to the user according to the decrypted result.

2. The access control method according to claim 1, further comprising obtaining the access token by aggregating a plurality of access conditions defined by the service provider.

3. The access control method according to claim 2, wherein the plurality of access conditions comprises at least one time-based access condition and one space-based access condition.

4. The access control method according to claim 1, further comprising signing the access token, by the secure cryptographic device, and transmitting the signed access token to the terminal, the terminal verifying an origin using a signature.

5. The access control method according to claim 1, further comprising incrementing the initialization vector at each new phase of signing-in the user.

6. The access control method according to claim 1, further comprising signing the keystream generated by the secure cryptographic device by the secure cryptographic device, encrypting the signed keystream using the public key of a cryptosystem of the user, decrypting, by the terminal, the keystream using the private key of the cryptosystem, and verifying an origin of the keystream using a signature.

7. The access control method according to claim 1, further comprising masking, by the terminal, a first biometric model with the keystream using an a XOR operation.

8. The access control method according to claim 1, wherein the first and second authentication devices are biometric readers of a same type, the authentication reference being a biometric reference and the authentication characteristic being a biometric characteristic.

9. The access control method according to claim 8, wherein the comparison between the biometric characteristic and the biometric reference is based on a classification of the biometric characteristic and the biometric reference into a plurality of classes, the comparison being conclusive if the classes in which the biometric characteristic and the biometric reference are classified are identical.

10. A method for controlling access of a user to a physical or logical resource, said user being equipped with a terminal provided with a first authentication device, said access control method comprising a signing-in phase with a service provider and a verification phase with an access control operator, wherein the signing-in phase comprises:

for each of a plurality of cryptographic modules, generating an access token from an elementary access criterion defined by the service provider, generating a corresponding keystream using a stream encryption, from the access token associated with the elementary access criterion and an initialization vector, and transmitting the keystream to the terminal; and obtaining, by the terminal, an authentication reference of the user using the first authentication device, masking the authentication reference using the keystreams, transmitting the masked authentication reference to a homomorphic encryption unit, to obtain a masked and encrypted authentication reference using a public key of a homomorphic cryptosystem, the masked and encrypted authentication reference being transmitted to a remote server to be stored in a database, and, the verification phase comprises:

transmitting, by the access control operator, the access tokens to the cryptographic modules that have generated the access tokens, each operator generating the keystream again if the associated elementary access criterion is met, and transmitting the keystream to the remote server;

obtaining, by the access control operator, an authentication characteristic of the user using a second authentication device, encrypting the authentication characteristic using the public key of said homomorphic cryptosystem, and transmitting, to the remote server, the encrypted authentication characteristic;

performing, by the remote server, successive addition of the masked and encrypted authentication reference of the user to the keystreams of said plurality of cryptographic modules, so as to obtain the homomorphically-encrypted authentication reference of the user:

performing, by the remote server, a comparison of the encrypted authentication characteristic and the homomorphically-encrypted authentication reference in a homomorphic domain, and transmitting, to the access control operator, a result of the comparison obtained in the homomorphic domain; and decryption, by the access control operator, the result of the comparison using a private key of the homomorphic cryptosystem, and granting or denying access to the user according to the decrypted result.

* * * * *